July 3, 1923.

J. ALBRECHT 1,460,693

BOX MAKING MACHINE

Filed Feb. 20, 1922

INVENTOR.
BY John Albrecht
Morsell & Keeney
ATTORNEYS.

July 3, 1923.

J. ALBRECHT

BOX MAKING MACHINE

Filed Feb. 20, 1922

INVENTOR.
John Albrecht.
BY
Morsell & Keaney
ATTORNEYS.

July 3, 1923.

J. ALBRECHT

BOX MAKING MACHINE

Filed Feb. 20, 1922

INVENTOR.
John Albrecht
BY
Morsell & Keeney
ATTORNEYS.

July 3, 1923.

J. ALBRECHT 1,460,693

BOX MAKING MACHINE

Filed Feb. 20, 1922

INVENTOR.
BY John Albrecht
Morsell & Keeney
ATTORNEYS.

July 3, 1923.

J. ALBRECHT

BOX MAKING MACHINE

Filed Feb. 20, 1922

INVENTOR.
John Albrecht.
BY Morsell & Keeney
ATTORNEYS

July 3, 1923.

J. ALBRECHT

1,460,693

BOX MAKING MACHINE

Filed Feb. 20, 1922

INVENTOR.
John Albrecht.
BY Morsell + Keeney
ATTORNEYS.

Patented July 3, 1923.

1,460,693

UNITED STATES PATENT OFFICE.

JOHN ALBRECHT, OF KEWAUNEE, WISCONSIN.

BOX-MAKING MACHINE.

Application filed February 20, 1922. Serial No. 538,075.

*To all whom it may concern:*

Be it known that I, JOHN ALBRECHT, a citizen of the United States, and resident of Kewaunee, in the county of Kewaunee and State of Wisconsin, have invented new and useful Improvements in Box-Making Machines, of which the following is a description, reference being had to the accompanying drawings, which are a part of this specification.

This invention relates to improvements in box making machines and more especially to machines of this character which are adapted to saw the tops and bottoms of round boxes or containers such as are usually employed for holding cream or other cheese and thereafter nailing or otherwise securing the side portions to the said tops and bottoms. The invention has for its primary object to provide a machine for holding the top and bottom boards which are glued or otherwise fastened together to provide a sufficient width and which are then sawed into circular form after which a strip of flexible material, such as veneer or relatively thin wood is curved or bent around the said bottom or top to which it is secured as by nailing. A further object of the invention is to provide a machine which will be substantially automatic in its operation, which will be comparatively inexpensive to manufacture and which will be more efficient than those which have been heretofore proposed.

With these and other objects in view, which will appear as the description proceeds, the invention consists in the novel details of construction and combinations and arrangements of parts more fully hereinafter disclosed and particularly pointed out in the claims.

Referring to the accompanying drawings in which like refernce characters designate like parts in all the views.

Figure 1:
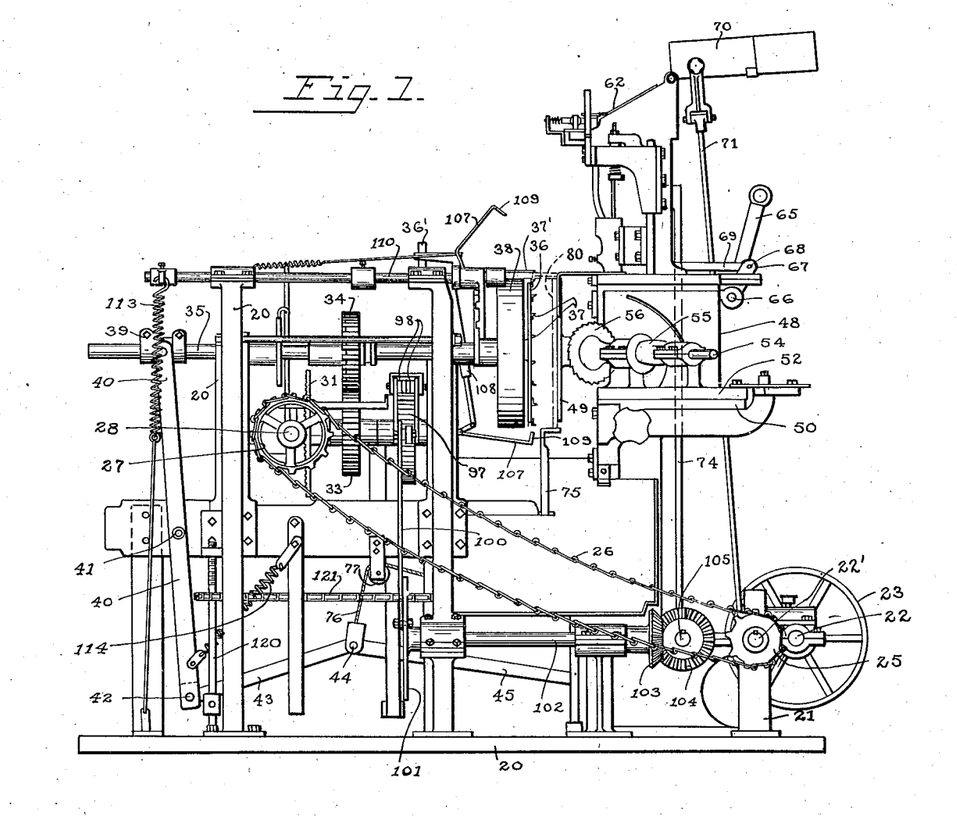
Figure 1 is a diagrammatic side elevational view of a machine constructed in accordance with the present invention.
Figure 10:
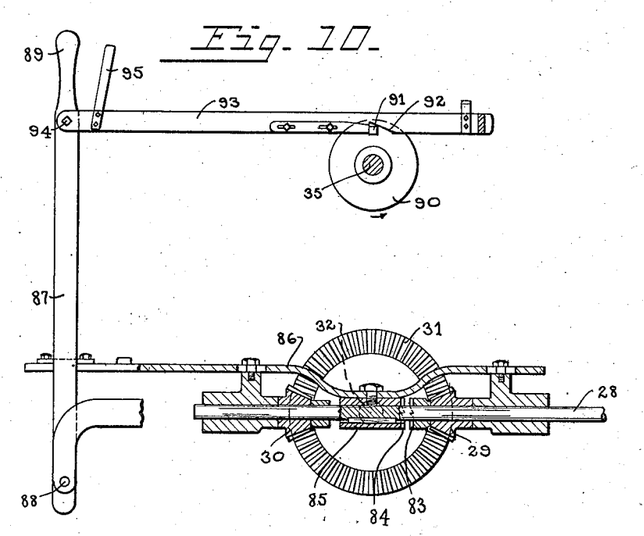
Fig. 10 is a detail sectional view on an enlarged scale of the mechanism controlling the rotation of the box holding member, said view being taken on the line 10—10 of Fig. 3 looking in the direction of the arrows.

Referring more especially to Figs. 1 to 4 inclusive, the numeral 20 designates a frame of cast iron or other suitable construction which frame is provided with the upright standards 21 in which is journaled the main power shaft 22 carrying the driving pulleys 23 which receive power from any suitable source through a belt or belts, not shown. A shaft 22' driven by the shaft 22 carries upon one end a sprocket wheel 25 around which passes a sprocket chain 26 and which drives a sprocket wheel 27 mounted upon a transversely extending shaft 28 suitably journaled in the frame work of the machine. As is best shown in Figs. 1 and 10, the said shaft 28 carries a pair of loosely mounted beveled pinions 29 and 30 which mesh with a beveled gear 31 rigidly mounted on the longitudinally extending shaft 32 which carries a spur gear 33 meshing with a spur gear 34 which latter gear is splined to a longitudinal shaft 35 which is slidably mounted in suitable bearings carried by the frame 20. The said shaft 35 is provided at one end with a disk member 36 rigid therewith and provided with a plurality of projections or prongs 37 which are adapted to slightly penetrate the wood or other material from which the boxes are being formed in order to securely hold the same in place during the cutting operation, all as will more fully appear below. The said shaft 35 is also provided with a drum or mandrel 38 adjacent the said disk 36 and the said shaft together with the said disk and mandrel is adapted to be moved axially in its bearings by means of the strap 39 which is engaged by one end of the lever 40, which lever is pivoted as at 41 to a portion of the frame work and is connected as at 42 to a link 43 which in turn is connected as at 44 to a treadle member 45 provided with a treadle 46, see Figs. 1, 2 and 3. The said treadle member 45 is preferably pivotally secured to the frame work of the machine as at 47, as will be clear from Fig. 3, and the said members 43 and 45 thus constitute a toggle lever which, when the treadle 46 is depressed, will act through the vertically disposed lever 40 to move the shaft 35 in axial direction as will be readily apparent.

Rigidly supported upon the frame part 20' in any suitable manner is a head 48 which supports a companion disk member 49 which is in axial alignment with the movable disk 36 above described. The said disk 49 is adapted to rotate around its axis but it is fixed so far as axial movement is concerned and it serves as an abutment against which the material to be acted upon may be held by the movable disk 36 as will presently appear. The said head 48 may be provided with an extension 50 which is provided with suitable guideways 51 in which is slidably mounted a slide member 52 provided with bearings 53 carrying a shaft 54 upon which is mounted a pulley 55 and a suitable circular saw 56. The said saw 56 may be of any desired construction but it is preferably cupped or dished so that when it is brought in contact with the material as it is held between the two disks 36 and 49 and the latter are revolved, said saw will make a clean cut to provide an accurate circular wooden disk to form the top or bottom wall of the finished container.

Figure 4:
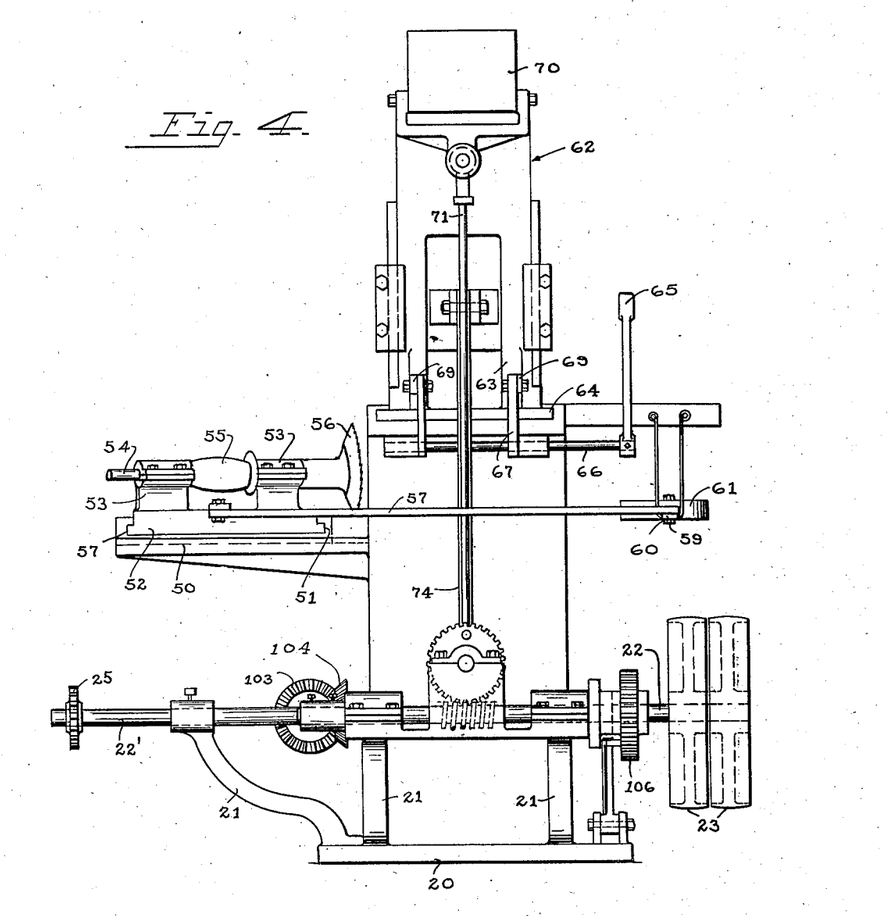
Fig. 4 is an end elevational view on an enlarged scale of the parts shown in Figs. 1, 2 and 3, as seen from the right of Figure 1.
Figures 5, 7:
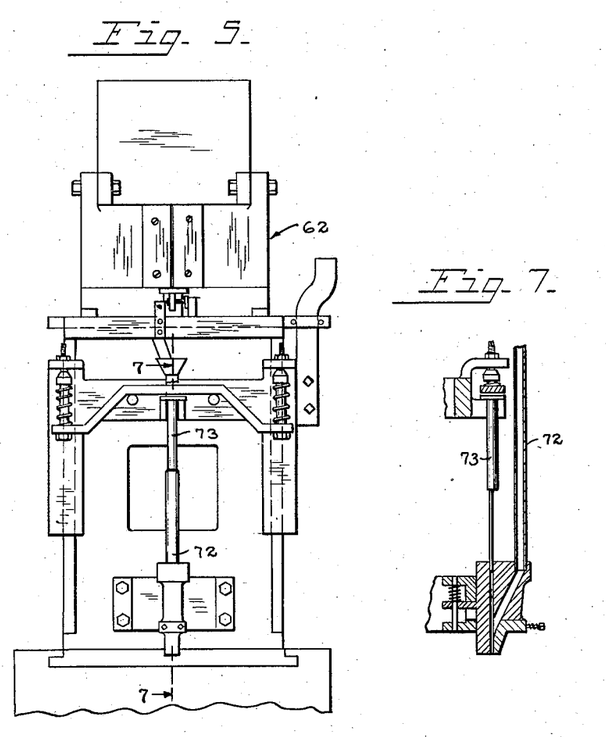
Fig. 5 is a detail elevational view on an enlarged scale of the nailing mechanism shown in Figs. 1, 2 and 4.
Fig. 7 is a fragmentary vertical sectional view through the nail feeding chute taken on the line 7—7 of Fig. 5, looking in the direction of the arrows.
Figure 6:
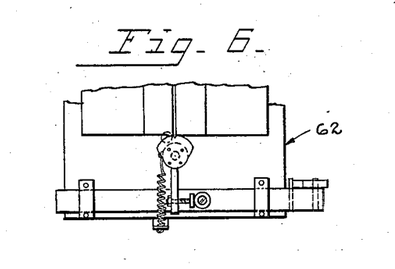
Fig. 6 is a fragmentary top plan view of the parts illustrated in Fig. 5.
Figure 8:
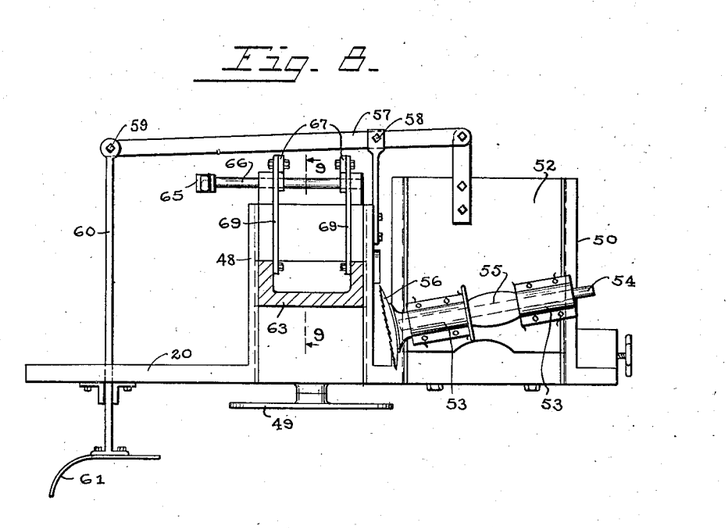
Fig. 8 is a horizontal sectional view taken on the line 8—8 of Fig. 2 and showing the saw which cuts out the end blanks for the finished boxes together with its associated mechanism.

The saw-carrying slide 52 is adapted to be moved into and out of operative position by means of the horizontally disposed lever 57, pivotally secured as at 58 to a suitable part of the frame and at 59 to the transverse push rod 60 as is best shown in Figs. 4 and 8. Said rod 60 projects through a portion of the frame work 20 which serves as a guide and is provided on its other end with an operating handle member or arm 61, as will be clear from the drawings.

Figure 9:
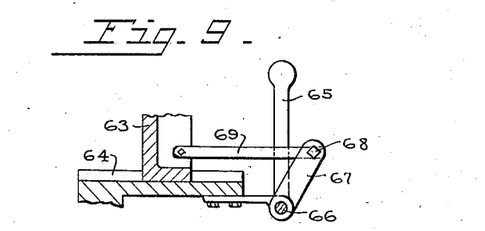
Fig. 9 is a detail sectional view taken on the line 9—9 of Fig. 8 and showing the means for moving the nailing mechanism into and out of its operative position.

The nailing mechanism is indicated generally by the numeral 62 and the said nailing mechanism is mounted upon a slidable base 63, see Fig. 8, which base is adapted to slide in suitable ways 64 provided in the head 48 above described. Means for moving the nailing mechanism into and out of operative position are provided comprising the handle 65 which is rigidly secured to a rock shaft 66 which carries a lever 67 to which is pivotally connected as at 68 the link 69 which link is suitably connected to the portion 63 of the nailing mechanism, as will be clear from Fig. 9. It therefore follows that when the handle member 65 is oscillated to and fro its motion will be transmitted through the parts just described to the base member 63 which carries the nailing mechanism and the latter will be moved along it ways 64 into or out of the operative nailing position.

The nail driving mechanism may be of any suitable or desired type and that here shown forms no special part of the present invention, but it is specifically described and claimed in my co-pending application Serial No. 496,468. It may be here stated however that the said mechanism comprises a feed member or hopper 70 which is adapted under the influence of the oscillating member 71, which may be driven in any desired manner from the power shaft 22, to feed nails or other suitable fastening members into and through the nail chute 72 from whence they pass beneath a reciprocating driver or hammer 73 which is suitably actuated by means of a connecting rod 74 driven from the said power shaft 105 in any suitable manner.

Figure 3:
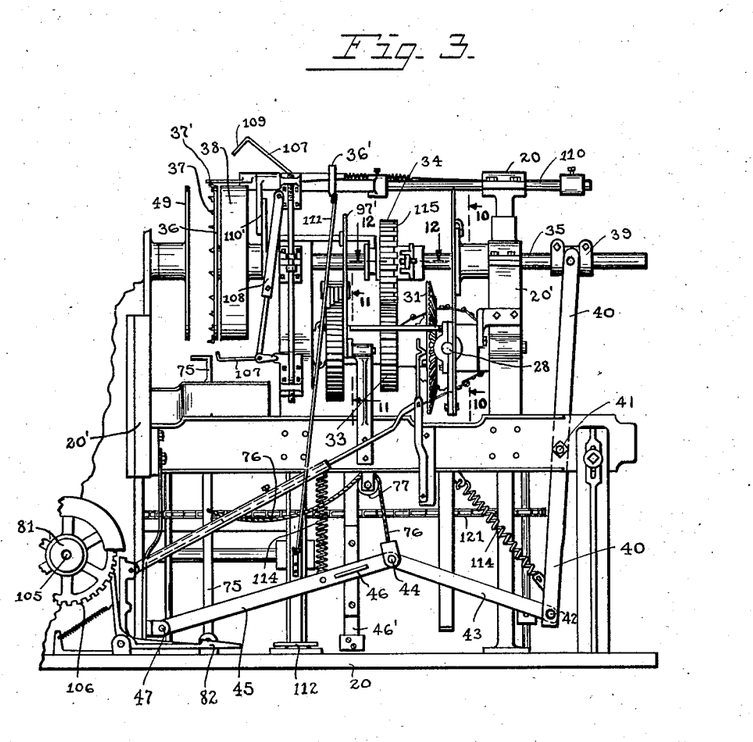
Fig. 3 is a fragmentary side elevational view of a machine constructed in accordance with this invention as seen from the side opposite to that shown in Figure 1, a portion of the parts being omitted.

A suitable supporting lever 75 is provided just below the disk member 49 for the purpose of supporting the disk making material before it is clamped between the holding members 36 and 49 and the said lever 75, as best shown in Figs. 1 and 3 is pivoted to the base of the frame 20 and connected by means of a cable or chain 76 passing over a pulley 77 to the pivot 44 which connects the links 43 and 45 of the treadle toggle. It thus results that whenever the said treadle is depressed to move the shaft 35 in an axial direction to cause the holding members 36 and 49 to grip a piece of wood which has been placed in position therebetween that as soon as the said wood is gripped by the said members the support 75 upon which it has been resting will be withdrawn to one side whereupon the said wood or other material may be rotated and acted upon by the saw 56 above described.

The operation of the present machine is as follows: Flat sheet material, such as laminated boards of suitable dimensions is introduced between the disk holding members 36 and 49, as is illustrated by the dotted lines 80 in Fig. 1, the said material resting upon the supporting lever 75. A foot of the operator is then pressed upon the treadle 46 which is depressed thereby to locking position with the shouldered locking member 46', and moving the shaft 35 in an axial direction through the medium of the connections 40, 43 and 45 and causing the plate or disk 36 to engage the said material 80 and the prongs 37 which are carried by the said disk 36 to slightly penetrate the same. As the material 80 is firmly gripped between the two members 36 and 49 the pivot 44 of the treadle toggle has reached a point where it causes the slack in the cable or chain 76 to be taken up and the said cable or chain then moves the supporting lever 75 from beneath the material 80 whereupon the parts are in the positions for the sawing operation.

The said sawing operation is accomplished by the operator pushing in upon the handle 61 of the push rod 60 which motion is transmitted to the horizontal lever 57 and from it to the saw carrying slide member 52 which moves the saw 56 into contact with the material held between the disks 36 and 49. The said saw is being rapidly revolved by means of a belt, not shown, which engages the pulley 55 carried by the saw shaft 54, and the disk members 36 and 49 together with the material 80 firmly held between them are also revolved about the axis of the shaft 35 as follows: Power from the shaft 22 is transmitted through a sprocket wheel 25 from whence it is transmitted by means of the sprocket chain 26 to the sprocket wheel 27 and shaft 28 upon which the said wheel 27 is mounted. Said shaft 28, as was above described, has loosely mounted upon it a pair of bevel pinions 29 and 30 and the said pinion 29 is provided with suitable clutch teeth 83 adapted to be engaged and disengaged by companion teeth 84 carried by a clutch member 85 splined to the said shaft 28 and adapted to be moved longitudinally thereof by means of the controlling bar 86 which is actuated by means of a lever 87 pivoted as at 88 to some convenient point of the frame and provided with an operating handle 89 as is best shown in Fig. 10.

Assuming that the lever 87 is in such position that the clutch teeth 83 and 84 are engaged, the power which has reached the shaft 28 will be transmitted therefrom to the clutch member 85 thence through the clutch teeth 84 and 83 to the beveled pinion 29 from whence it reaches the beveled gear 31 which meshes with the said pinion and which is carried by the shaft 32. From the shaft 32, the power is transmitted through the spur gears 33 and 34 to the shaft 35 which carries the disk 36 and the drum or mandrel 38 as was above disclosed.

The parts are so designed that upon the shaft 35 completing a full revolution during which time the saw 56 is acting upon the material 80 held between the plates 36 and 49, the clutch member 85 will be automatically disengaged from the companion clutch member carried by the pinion 29 and the rotation of the shaft 35 stopped. This automatic disengagement of the clutch is accomplished by means of the disk 90 carried by the shaft 35 which disk is provided with a projecting pin or lug 91 which is adapted to engage with the notch 92 cut in the lever 93 which lever is pivotally connected as at 94 to the clutch controlling lever 87 above described. The said lever 93 is provided with a handle or grip member 95 by means of which it may be readily swung around its pivot 94 in order that the notch 92 thereof may be disengaged from the pin or projection 91 for a purpose which will now be described. That is to say: The normal position of the lever 93 is substantially that shown in Fig. 10. When it is desired to engage the clutch teeth 83 and 84 in the manner above mentioned it is first necessary to raise the lever 93 by swinging it about its pivot 94 whereupon the clutch controlling lever 87 may be moved to the right as seen in Fig. 10 and the said clutch teeth brought into engagement. This engagement will, through the connections above disclosed, result in the rotation of the shaft 35 in the direction of the arrow shown in Fig. 10 and such rotation will carry the pin 91 out of register or engagement with the notch 92 in the said lever 93. As soon as the shaft 35 has started to move the lever 93 may be released whereupon as soon as the pin 91 has made a complete revolution it will again engage the notch 92 of the lever 93 and will force the said lever to the left as seen in Fig. 10 carrying with it the lever 87, the clutch controlling rod or bar 86 and thus automatically disengage the clutch teeth 83 and 84 to stop the rotation of the shaft 35.

The top or bottom disk which is to comprise the corresponding wall of the finished box having thus been formed, the mandrel 38 is moved adjacent the disk by lever or handle 36'. When thus arranged, strip material of suitable width is introduced into the machine as indicated by the dotted lines 96 in Fig. 2, whereupon the handle member 65 is operated to bring the nailing mechanism into its operative position.

The feed 70 of the said mechanism is oscillated by its rod 71, to feed nails through the chute or passage 72 to the plunger 73, which in turn is reciprocated by its connecting rod 74, to drive the said nails through the edge of the strip 96 into the edge of the disk 80.

Figure 11:
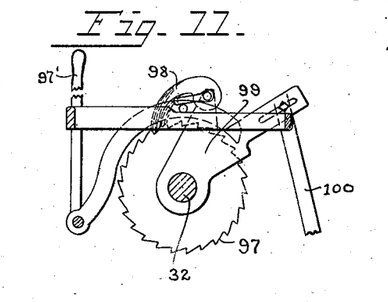
Fig. 11 is a detail sectional view of the intermittent feed device for the box holding member, taken on the line 11—11 of Fig. 3.

As this operation is being carried out, the shaft 35, and the holding members 36 and 49 carrying the said disk 80, are intermittently rotated by means of a pawl and ratchet mechanism, mounted upon the shaft 32 and actuated indirectly from the power shaft 105. The said mechanism comprises a ratchet wheel 97 mounted upon the shaft 32, the teeth of which are adapted to be engaged by a plurality of pawls 98, pivotally carried by an oscillating pawl carrier 99, which is actuated by a link 100 (see Figs. 1 and 11). As here illustrated, there are four pawls, each of a different length, which are adapted to successively engage the same tooth of the ratchet wheel 97 to turn the same one quarter of the angular distance of one tooth. This construction permits of a relatively small angular movement of the said wheel for each operation of the link 100, with a correspondingly small intermittent movement of the shaft 35 and the box which is being formed. It will be understood that the parts are so timed that between each of the said movements, the plunger 73 is operated to drive a nail into the edges of the box parts. It will likewise be understood that the intermittent movement of the shaft 35 and its associated parts, just described, is accomplished while the clutch teeth 83 and 84 are disengaged, so that no power is being transmitted to the said shaft 35 from the continuously revolving shaft 28.

The link member 100, which actuates the pawl carrying member 99, is connected at its lower end to a revoluble disk 101, carried by a longitudinally extending shaft 102, which carries a bevel gear 103 meshing with a companion gear 104 carried by the transverse shaft 105, which latter may be driven from the power shaft 22 in any suitable manner, as by a gear train 106. The movements of the nailing mechanism 62 and of the intermittent feed just described are both controlled by the clutch 81 associated with the said shaft 105, whereby both mechanisms operate and stop simultaneously. It thus results that the intermittent feeding and the nailing are both under positive control of the operator, and continue so long as he maintains pressure upon the clutch controlling treadle 82. In practice, the intermittent movement is continued for somewhat more than one complete revolution of the shaft 35, thereby slightly over-lapping the material 96, after which the motion is stopped by releasing the treadle 82, the material 96 severed in any suitable manner, and the nailing mechanism 62 moved back to its inoperative position by the arm 65.

The box member is now in condition for the withdrawal of the mandrel 38 and the holding disk 36 so that the said box member itself may be removed from the machine and in order to facilitate the said withdrawal of the mandrel and holding disk there is provided a pair of pivoted fingers 107 (see Fig. 1), which fingers are preferably interconnected by a link member 108 so that they will operate in unison.

Figure 2:
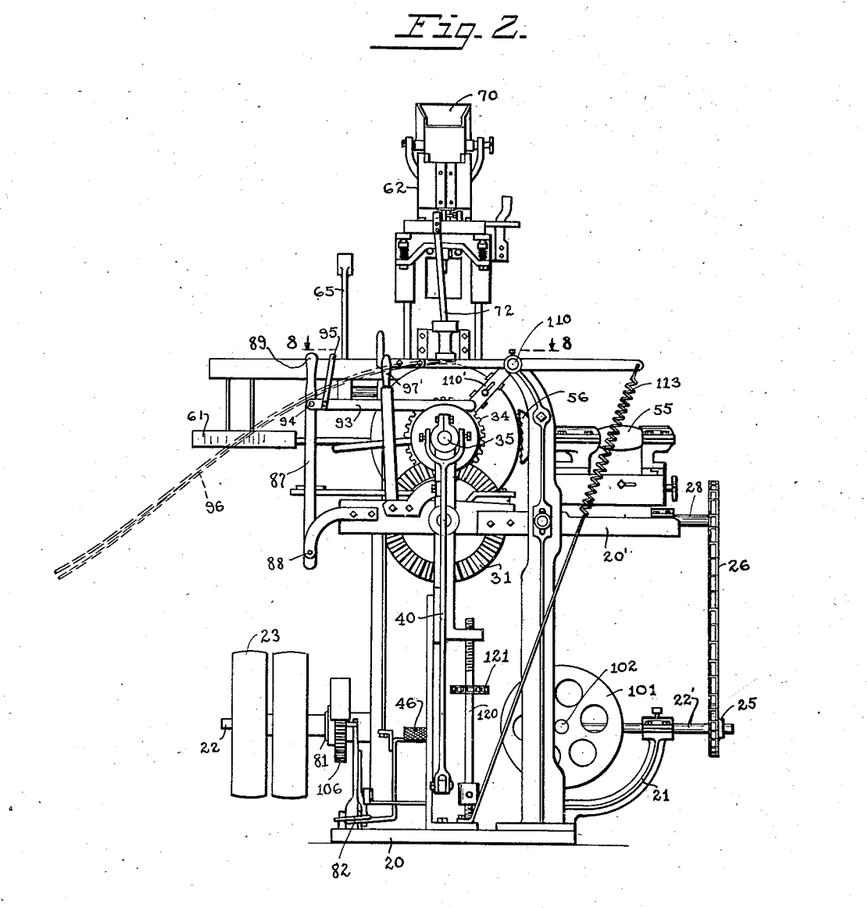
Fig. 2 is a end elevational view of the parts illustrated in Figure 1 as seen from the left of the said figure.

The drum or mandrel 38 is guided by arm 110′, Fig. 3, which is controlled by lever 36′ on rock shaft 110. On one end of the rock shaft is an elbow shaped piece of steel which forms the pressure bar 37′. When the strip of material of suitable width 96 is introduced into the mandrel 38 and over material 80, the handle member 65 is operated to bring the nailing mechanism into its operative position. The pressure bar 37′ is held against the top of the strip 96 by foot pedal 112 which is connected by a rod to handle 36′. The handle 97′ Fig. 2, is pushed forward which lowers pawls 98 into acting position on ratchet 97, Fig. 11. At every stroke of the hammer 73, which works simultaneously with the shaft 105, power is transmitted through gears 103 and 104 to shaft 102, and hence to link 100 which causes the shaft 35 to rotate, as it can be seen that gears 33 and 34 mesh.

The pressure bar 37′ is actuated by means of a rock shaft 110 suitably journaled in the frame 20 and adapted to be oscillated in its bearings by means of a link 111 (see Fig. 3) which link is connected at its lower end to a treadle 112. A suitable spring 113 is adapted to return the shaft 110 to its normal position, and a similar spring 114 may be employed for returning the lever 40, which controls the position of the shaft 35, to its normal position.

It will be understood that from the time the treadle 46 was originally depressed to cause the disk 36 to grip the board material up to the completion of the nailing operation, the said treadle has been continually held down by locking device 46′, Fig. 3. The operator's foot has been employed to depress the treadle 82 which controls the operation of the intermittent feed and the nailing mechanism. The operator's other foot in the meantime is pressed upon the treadle 112, thereby bringing the pressure bar 37′ upon the strip 96 during the process of nailing. The said fingers 107 are actuated by means of the operator's hand pressing the upper one upon the top of the mandrel 38 and against the material 96. As soon as this is accomplished, the operator trips or pushes his foot against the lock 46′, which releases the member 45, and the springs 114 bring the lever 40 to its original position, and the said lever will cause the shaft 35, together with the mandrel 38 and the disk 36, to move in an axial direction whereby the said mandrel and disk are withdrawn from the interior of the completed box member. Upon the release of the treadle 46 the temporary supporting member 75 will also return to its initial position beneath the box member and will serve to support the same until it is removed from the machine by hand.

The link 100 can be adjusted in a slot of member 99 so as to effect the angular movement of the mandrel 38 during the process of nailing strip 96 to material 80.

Figure 12:
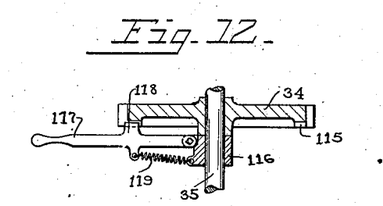
Fig. 12 is a horizontal detail sectional view taken on the line 12—12 of Fig. 3, showing the manually operable means for turning the box holding member when it is desired to initially start the nailing of the side portion to the box.

It sometimes happens that it is desirable to rotate the shaft 35 and its associated parts a short distance in order to bring the said parts to a desired position beneath the nailing mechanism. The amount of rotation necessary may be very small and it would be somewhat difficult to accurately position the parts if the power drive be employed. The invention therefore provides a manual means for rotating the shaft 35, said means comprising crown teeth 115 cut upon the surface of the gear 34 which is splined to the shaft 35 (see Figs. 1, 3 and 12). Pivotally secured to the collar 116 is a lever 117 provided with a tooth 118 which is adapted to swing into engagement with the said crown teeth 115. The tooth 118 of the lever 117 is normally held out of engagement with the said crown teeth 115 by means of a spring 119 which controls the said lever. When the lever 117 is moved against the tension of the spring so that its tooth 118 engages one of the teeth 115, the said lever may then be moved in the arc of a circle about the axis of the shaft 35 and thus rotate the said gear 34 and with it the said shaft. The said shaft will, of course, carry with it the mandrel 38 and the holding disk 36, and the partially completed box member may thus be rotated to bring any desired portion thereof beneath the nailing mechanism to start or finish the nailing operation.

The machine may be readily adjusted to make different sized boxes by merely changing the disks 36 and 49 and the mandrel 38. Should it be desired to change the diameter of the finished box it is only necessary to substitute for the said disks and mandrel then in use other disks and mandrel of the required dimensions. However, whenever the diameter of the boxes is changed it becomes necessary to raise or lower the shaft 35 and its associated parts in order that the uppermost point of the periphery of the partially formed box member may be in a proper position to receive the nails from the nailing mechanism. This is accomplished by mounting the said shaft 35 and its associated parts upon a movable portion 20' of the frame 20, which movable portion may be suitably raised and lowered by means of a pair of jack screws 120 which may be interconnected to operate simultaneously by means of a sprocket chain 121 engaging suitable sprockets upon the said screw shafts.

It will thus be seen that the present invention provides a mechanism for readily and efficiently manufacturing both top and bottom members of circular containers such as cheese boxes and the like from wood or other suitable material, which material may be fed to the machine in pieces of different shapes and dimensions where it is suitably operated upon to provide disk members to constitute the top and bottom walls of the finished container, after which the side walls thereof are suitably secured thereto. The said machine is comparatively simple in construction and may be easily and efficiently operated by one man, thus reducing materially the cost of labor and consequently lowering the cost of the finished article.

It is obvious that those skilled in the art may vary the details of construction as well as the arrangement of parts without departing from the spirit of the invention, and therefore it is not wished to be limited to the above disclosure except as may be required by the claims.

What is claimed is:

1. In a device of the class described the combination of means for holding a piece of box forming material; means for cutting a substantially circular box end from said material; means for positioning another piece of material in co-operative relation with said first piece while so held to form the side walls of a box; means for securing said pieces of material together; and means for moving said pieces of material to present successive portions thereof to said securing means.

2. In a device of the class described the combination of rotatable means for holding a piece of box forming material; means for cutting said material; means for rotating said holding means to cause said cutting means to cut said material to a predetermined circular shape; means for positioning another piece of material in co-operative relation with said first piece while so held to form a box member; means for securing said pieces of material together; and means for moving said pieces of material to present successive portions thereof to said securing means.

3. In a device of the class described the combination of means for holding a piece of box forming material, means for cutting a substantially circular box end from said material, means for positioning another piece of material in co-operative relation with said first piece while so held to form the side walls of a box, means for securing said pieces of material together, and means for intermittently moving said pieces of material to present successive portions thereof to said securing means.

4. In a device of the class described the combination of rotatable means for holding a piece of box forming material, means for cutting said material, means for rotating said holding means to cause said cutting means to cut said material to a predetermined circular shape, means for positioning another piece of material in co-operative relation with said first piece while so held to form a box member, means for securing said pieces of material together, and means for intermittently moving said pieces of material to present successive portions thereof to said securing means after said rotation has ceased.

5. In a device of the class described the combination of slidable means for holding a piece of box forming material, a saw for cutting said material to a predetermined circular shape, means carried by said slidable means for positioning another piece of material in co-operative relation with said first piece to form a box member, means for securing said pieces of material together, and means for moving said slidable means to withdraw the same from the completed member.

6. In a device of the class described the combination of a pair of rotatable holding members one of which is movable relative to the others; means for moving said first mentioned member toward and from said second mentioned member to grip and release a piece of box making material; means for rotating said members and material; a cutting means associated with said members adapted to cut said material as it is rotated to form a disk; means for positioning a second piece of material in contact with said disk to form a box member; and means for securing said pieces of material together.

7. In a device of the class described the combination of means including a rotatable holding member and a cutting member for forming a flat circular box member blank; means for positioning a portion of a strip of material adapted to form the side walls of the box member in co-operative relation to said blank while the latter is held by said holding member; means for securing said portion of said strip and said blank together; and means for rotating said blank and strip to bring other portions of said strip into co-operative relation with said blank whereby they may be acted upon by said securing means.

8. In a device of the class described the combination of means for forming a flat circular box member blank comprising a pair of rotatable holding disks and a cutter; means for positioning a portion of a strip of material adapted to form the side walls of the box member in co-operative relation to said blank while so held; means for securing said portion of said strip and said blank together; and means for intermittently rotating said blank and strip to bring other portions of said strip into co-operative relation with said blank whereby they may be acted upon by said securing means.

9. In a device of the class described the combination of a rotatable disk; a longitudinally movable shaft carrying a second disk, in axial alignment with said first disk; means for moving said shaft and second disk longitudinally relative to said first disk, whereby a piece of box forming material may be gripped and held between said disks; means for rotating said disks and material; cutting means adapted to engage said material during said rotation to form therefrom a flat circular box blank; a mandrel carried by said shaft adapted to position and support a strip of material adapted to form the side walls of a box member in engagement with said blank while so held; means for securing said strip to said blank; and means for intermittently rotating said blank and strip, whereby successive portions of said strip may be brought into engagement with said blank and secured thereto by said securing means.

10. In a device of the class described the combination of a rotatable disk; a longitudinally movable shaft carrying a second disk, in axial alignment with said first disk; means for moving said shaft and second disk longitudinally relative to said first disk, whereby a piece of box forming material may be gripped and held between said disks; means for rotating said disks and material; cutting means comprising a rotatable saw adapted to engage said material during said rotation to form therefrom a flat circular box blank; means for moving said saw into and out of engagement with said material; a mandrel carried by said shaft adapted to position and support a strip of material adapted to form the side walls of a box member in engagement with said blank while so held; means for securing said strip to said blank; and means for intermittently rotating said blank and strip, whereby successive portions of said strip may be brought into engagement with said blank and secured thereto by said securing means.

11. In a device of the class described the combination of a rotatable disk; a longitudinally movable shaft carrying a second disk, in axial alignment with said first disk; means for moving said shaft and second disk longitudinally relative to said first disk, whereby a piece of box forming material may be gripped and held between said disks; means for continuously rotating said disks and material; means for automatically stopping said rotation at the completion of one revolution; independent means for manually rotating said disks and material; cutting means adapted to engage said material during said rotation to form therefrom a flat circular box blank; a mandrel carried by said shaft adapted to position and support a strip of material adapted to form the side walls of a box member in engagement with said blank while so held; means for securing said strip to said blank; and means for intermittently rotating said blank and strip, whereby successive portions of said strip may be brought into engagement with said blank and secured thereto by said securing means.

12. In a device of the class described the combination of a rotatable disk; a longitudinally movable shaft carrying a second disk, in axial alignment with said first disk; means for moving said shaft and second disk longitudinally relative to said first disk, whereby a piece of box forming material may be gripped and held between said disks; power means for continuous rotating said disks and material; means for automatically stopping said rotation at the completion of one revolution; independent means for manually rotating said disks and material; cutting means adapted to engage said material during said rotation to form therefrom a flat circular box blank; a mandrel carried by said shaft adapted to position and support a strip of material adapted to form the side walls of a box member in engagement with said blank while so held; and independent power means for intermittently rotating said blank and strip, whereby successive portions of said strip may be brought into engagement with said blank and secured thereto by said securing means.

13. In a box making machine, nailing mechanism adapted to secure a hoop to a disk, clamping means adapted to support the disk, and means for forming said disk from a blank engaged by said clamping means, whereby said disk, when formed, will be accurately positioned with respect to the nailing mechanism.

14. In a box making machine, the combination with mechanically operable mechanism for securing wooden members together, of means for holding and trimming a blank to the form of a disk, the periphery of the disk so held bearing a predetermined relation to said securing mechanism, said securing mechanism being movable into and out of operative position with respect to the disk, and means co-operating with said holding means for winding a hoop member upon the disk and rendering said securing means operative to fasten the hoop member to the disk.

15. In a box making machine, the combination with automatic nailing mechanism movable between an advanced and a retracted position, of means for engaging a blank and trimming said blank to provide a circular margin in an operative position with respect to said nailing mechanism in its advanced position, and means for intermittently advancing the periphery of the blank beneath said nailing mechanism, whereby a hoop may be wound upon said blank and secured thereto at intervals.

16. In a box making machine, means for clamping a blank in a rotatable position, means for trimming the blank to circular form, mechanically operable securing mechanism normally maintained in a retracted position, but movable into operative position above the periphery of the trimmed blank, and means co-operating with said clamping means for winding a strip of hoop forming material upon the blank and simultaneously operating said securing mechanism.

17. A box making machine, including a set of rotatable members, means for clamping a blank between said members, means for rotating the members and trimming the margin of the blank, means for nailing a hoop member to the trimmed periphery of the blank while maintaining said blank in clamped position, and means for rotating said members intermittently to advance the periphery of the blank past said nailing means in the intervals between successive nailing operations.

18. A box making machine including means for clamping a blank in rotatable position, means for rotating the blank and for simultaneously cutting its margins to circular form, means for securing one end of a hoop member to the blank while maintaining the blank in its clamped position, means for intermittently rotating the blank to wind the hoop member thereon, and means for operating said hoop securing means between successive advancing movements of the periphery of said blank to secure the hoop member thereto at intervals.

19. In a box making machine, a machine frame, a set of clamping members supported by said frame and rotatable upon a horizontal axis, means for engaging a blank between said clamping members, means for rotating said members and trimming said blank to circular form, and nailing mechanism normally retracted from the path of said blank and movable from said retracted position to a predetermined point relative to the trimmed blank, said nailing mechanism being adapted to secure a hoop at intervals to the periphery of said blank.

20. In a box making machine, nailing mechanism movable to and from operative position, a cylindrical mandrel in predetermined relation to the operative position of the nailing mechanism, means for clamping a blank adjacent the side of the mandrel, means for trimming the blank in substantial conformity with the periphery of the mandrel, means co-operating with the mandrel to maintain a hoop member in contact with the mandrel and the trimmed blank, and means for causing said nailing mechanism to secure the hoop to the blank at intervals about its periphery.

21. The process of making cylindrical boxes, consisting in clamping a blank between rotatable members, trimming the blank to circular form and leaving it centered with an adjacent member bearing a predetermined relation to a nailing device, automatically winding a hoop about the circular blank and the adjacent member, and simultaneously nailing the hoop to the blank.

In testimony whereof, I affix my signature.

JOHN ALBRECHT.